United States Patent [19]
Orazi

[11] 3,756,541
[45] Sept. 4, 1973

[54] AIRCRAFT
[76] Inventor: Paolo Orazi, S. Fiorona 1, Brescia, Italy
[22] Filed: Jan. 25, 1971
[21] Appl. No.: 109,104

[52] U.S. Cl..................... 244/39, 244/123, 416/88, 416/131, 416/238
[51] Int. Cl. .......................................... B64c 27/46
[58] Field of Search....................... 244/39, 35, 123, 244/124; 416/87, 88, 131, 226, 238

[56] References Cited
UNITED STATES PATENTS
2,001,529   5/1935   Dornier............................ 244/39 X Primary Examiner—Milton Buchler
Assistant Examiner—Carl A. Rutledge

[57] ABSTRACT

The fuselage carries a rotatable tubular spar. Ribs fixed transversely of the spar support wing sheets. Slots in the wing sheets enable the ribs to pass through the wing sheets. Stops on the ends of the ribs limit the radial movement of the wing sheets. The slots and stops permit the tubular spar to flex during rotation.

5 Claims, 4 Drawing Figures

PATENTED SEP 4 1973    3,756,541

AIRCRAFT

This invention concerns improvements in or relating to wings of aircraft and, more particularly to rotary wings of aircraft.

A conventional wing rotating about its span axis can only attain a low angular velocity because of ellipsoidal vibration of the tip of the wing resulting from the flexing of the supporting spar of the wing, governed by the different bending resistances of the wing in directions parallel to and perpendicular to the plane of the wing.

It is an object of this invention to provide an aircraft wing capable of rotating about its span axis with high angular velocity.

According to the present invention there is provided a rotary wing assembly for an aircraft, said assembly comprising a spar intended to be rotatably mounted upon an aircraft fuselage, and wing sheets forming flying surfaces and mounted upon a frame including said spar, the said spar being so linked to said wing sheets that it can undergo limited movement relatively to said wing sheets in the plane of the wing, whereby during rotation of the wing the said spar can flex in the plane of the wing without transmission of corresponding bending movement to the wing sheets. The invention is illustrated, by way of example, in the accompanying drawings in which:

Figure 2:
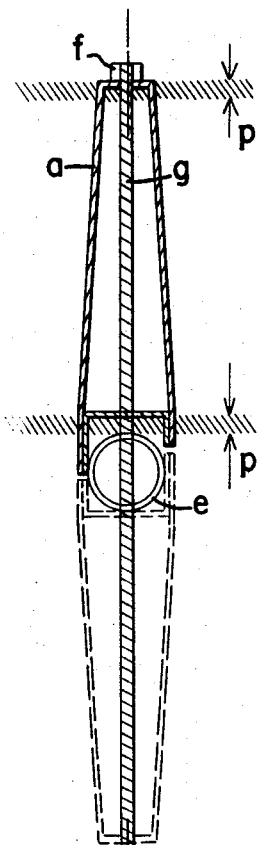
FIG. 2 is a cross-section of FIG. 1 along the line I—I, illustrating the limits of radial motion of the wing sheets.
Figure 1:
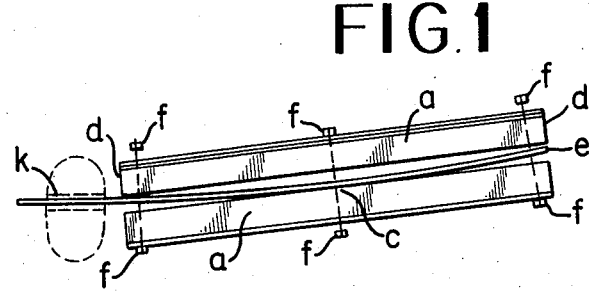
FIG. 1 is a side elevation of an embodiment of a wing according to the present invention, shown in rotary motion about its span axis.
Figure 3:
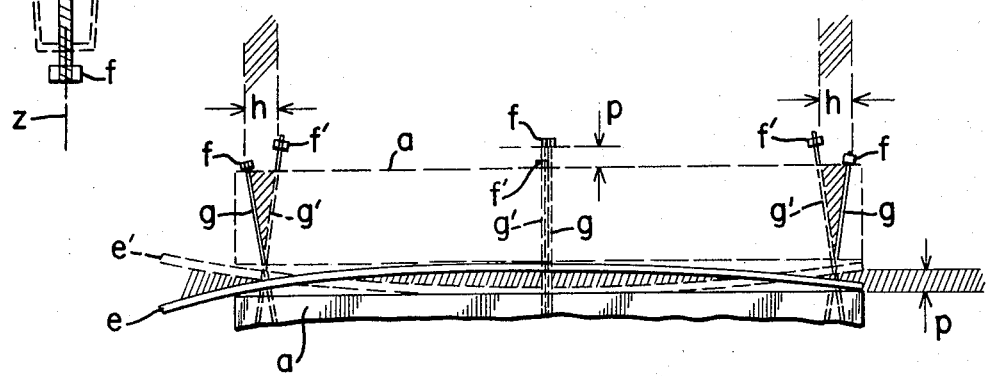
FIG. 3 is a detail of FIG. 1.
Figure 4:
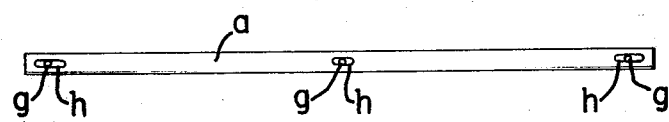

FIG. 4 is a view in profile of the wing shown in FIG. 1. Referring to the drawings, an aircraft fuselage $k$ carries a rotatable tubular spar $e$ transversely mounted in bearings $k$, which spar undergoes longitudinal flexion as shown in FIGS. 1 and 3 when in rotary motion. The spar $e$ has fixed thereto transverse ribs $g$ regularly disposed along the spar in one plane and extending symmetrically through the spar and each rib has stops $f$ arranged at the ends thereof.

Two longitudinally extending wing sheets $a$ are supported by the ribs $g$ each sheet having longitudinal slots $h$ through which the ends of the ribs $g$ extend, and each sheet being free to move along the ribs $g$ radially outwardly from the spar $e$ during rotation thereof, to the limit of the stops $f$.

During rotation of the wing, centrifugal force urges the wing sheets $a$ radially outwardly from the spar $e$ to the limits of the stops $f$. A longitudinal space $p$ is thus formed between the wing sheets $a$ in which the spare $e$ is free to flex in the plane of the wing without hindering the rotary motion of the wing. P represents the curvature of the spar.

As the spar $e$ flexes, between positions $e$ and $e'$ as shown in FIG. 3, the ribs $g$ will move with both radial and arcuate movement, as shown by positions $g$ and $g'$ in FIG. 3, and it is to accomodate this movement that the slots $h$ extend longitudinally as shown in FIG. 3.

What I claim is:

1. A rotary wing assembly for an aircraft, said assembly comprising a spar intended to be rotatably mounted upon an aircraft fuselage, and wing sheets forming flying surfaces and mounted upon a frame including said spar, the said spar having link means whereby said wing sheets can undergo limited movement relatively to said spar in the plane of the wing, whereby during rotation of the wing the said spar can flex in the plane of the wing without transmission of corresponding bending movement to the wing sheets.

2. An assembly as claimed in claim 1, wherein the spar is linked to the wing sheets by means of transverse ribs in a common plane attached symmetrically to the spar and extending to both sides thereof which ribs are associated with said wing sheets and permit radially outward movement of said wing sheets.

3. An assembly as claimed in claim 1, wherein said ribs have stops at the ends thereof to limit the radially outward movement of the wing sheets.

4. An assembly as claimed in claim 3 wherein the sheets are provided with slots for linkage of the frame thereto.

5. An assembly as claimed in claim 3, wherein the ribs pass through the slots provided in the wing sheets

* * * * *